United States Patent [19]

Vagi et al.

[11] Patent Number: 5,065,238

[45] Date of Patent: Nov. 12, 1991

[54] GEOMETRIC DISTORTION-FREE IMAGE INTENSIFIER SYSTEM

[75] Inventors: Robert J. Vagi, Broadview Heights; Leonard F. Plut, Concord Township, Summit County; David L. Leong, Northfield, all of Ohio

[73] Assignee: Picker International, Inc., Highland Heights, Ohio

[21] Appl. No.: 422,070

[22] Filed: Oct. 16, 1989

[51] Int. Cl.$^5$ .................. H04N 5/32; H04N 5/30
[52] U.S. Cl. .................. 358/111; 358/211; 378/99
[58] Field of Search .......... 358/111, 211, 110; 378/99, 22

[56] References Cited

U.S. PATENT DOCUMENTS

| 4,188,640 | 2/1980 | Dittrich et al. | 358/111 |
| 4,207,595 | 6/1980 | Dittrich et al. | 358/111 |
| 4,365,269 | 12/1982 | Haendle | 358/111 |
| 4,736,399 | 4/1988 | Okazaki | 378/99 |
| 4,761,803 | 8/1988 | Oppelt | 378/99 |
| 4,958,231 | 9/1990 | Tsuchiya | 358/211 |

OTHER PUBLICATIONS

C 300/400 Series Monolithic Wideband CRT Distortion Corrective Device, Intronics, 1980.
C310/410 Monolithic, Wideband CRT Geometry/Focus Corrector, Intronics, 1978.
Data Display Interfaces for CRT Deflection/Focus Correction, no author listed, before 1988, pp. 63-65.

*Primary Examiner*—James J. Groody
*Assistant Examiner*—Safet Metjahic
*Attorney, Agent, or Firm*—Fay, Sharpe, Beall, Fagan, Minnich & McKee

[57] ABSTRACT

A patient (12) is irradiated with x-rays (10) from an x-ray tube (A). X-rays that have passed through a region of interest of the patient are converted to a light image by a phosphor screen (14) on the dome shaped input face (16) of an image intensifier (B). The dome shaped input face causes the output optical image (20) of the image intensifier to be distorted with pin cushion distortion. The sweep pattern of the electron beam of a video pick up tube (24) of a video camera (C) is controlled by deflection plates (26a, 26b, 26c, 26d). A sweep control circuit (D) alters the sweep pattern such that electronic image representations generated by the video camera are distorted in a manner that is complementary to and cancels the image intensifier tube distortion. In this manner, the two distortions cancel and a man-readable image (28) displayed on a video monitor (22) is substantially distortion-free. The sweep control circuit alters conventional vertical sweep control voltage ramps (V) and horizontal control voltage ramps (H) by adding third order, parabolic terms:

$$V_T = V + V + kV(V^2 + H^2)$$

$$H_T = H + kH(V^2 + H^2)$$

Amplifiers (50a, 50b, 50c, 50d) boost the voltage of the parabolically corrected sweep control signals and apply them to the sweep control plates in a push-pull manner.

17 Claims, 3 Drawing Sheets

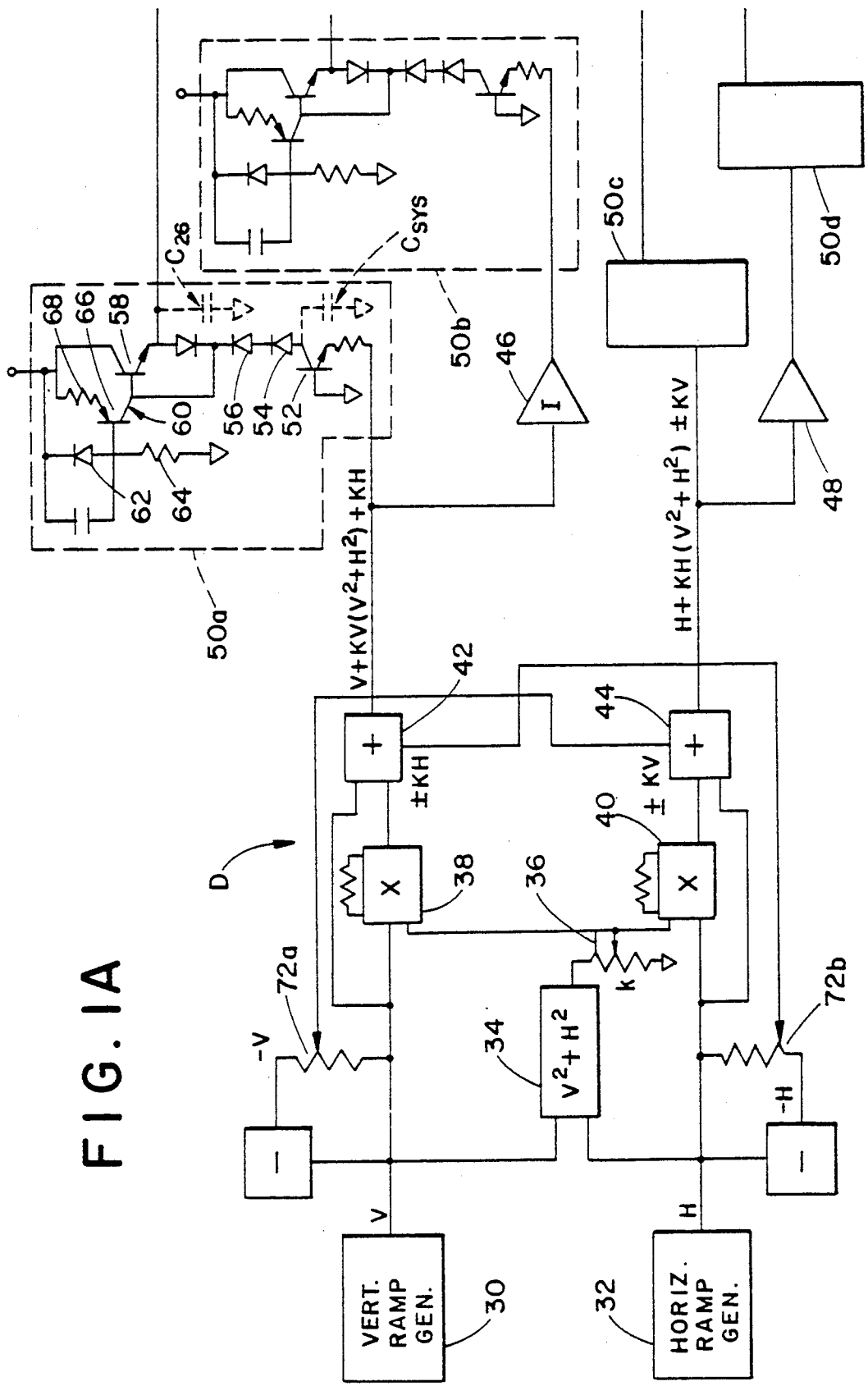
FIG. IA

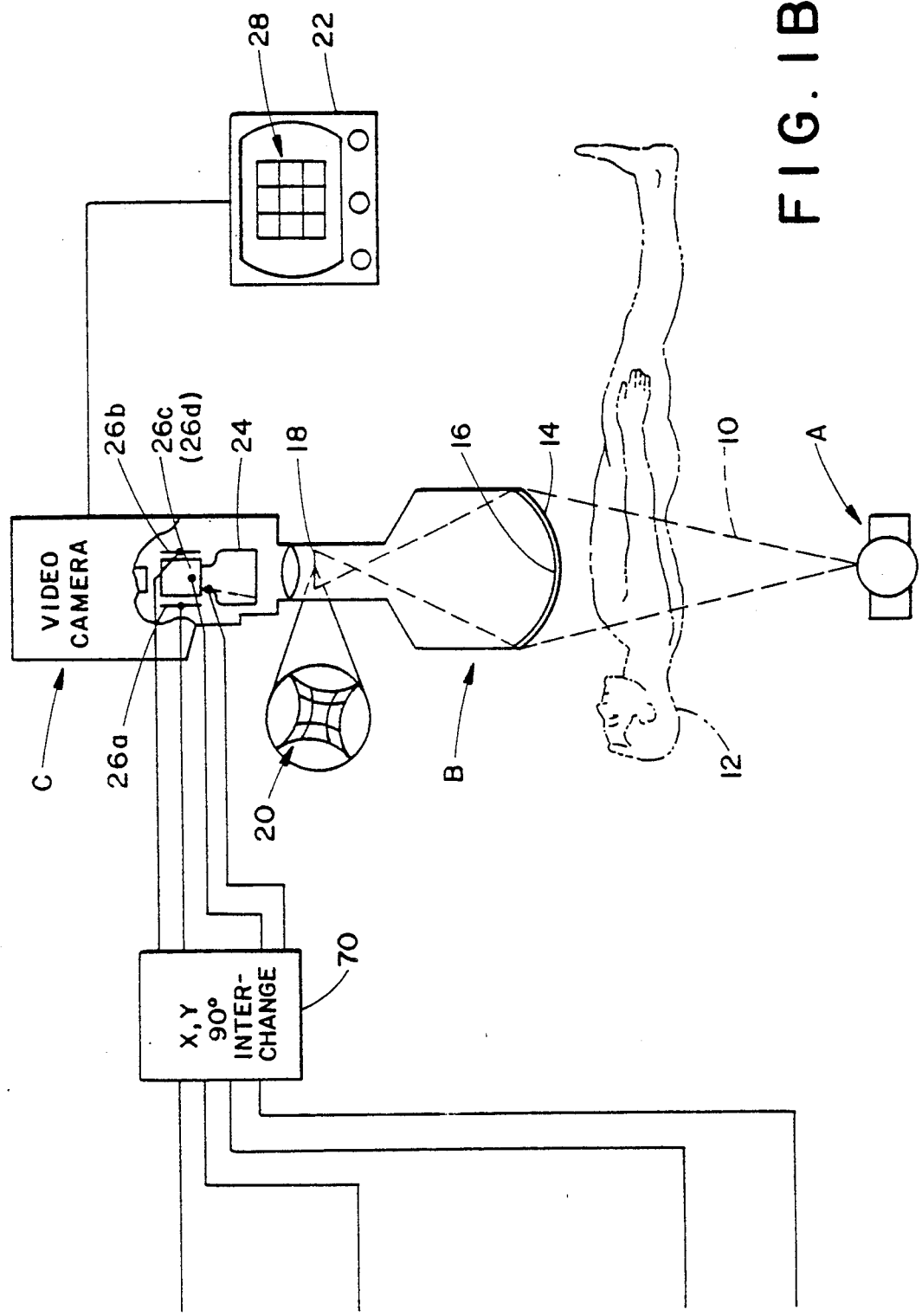

GEOMETRIC DISTORTION-FREE IMAGE INTENSIFIER SYSTEM

BACKGROUND OF THE INVENTION

The present invention relates to the image intensifier art. It finds particular application in conjunction with x-ray images that are monitored by a video camera and will be described with particular reference thereto. It is to be appreciated, however, that the invention may find utility in other applications without departing from the spirit and intent of the invention.

Traditionally, x-rays were projected through a patient onto a flat sheet of photographic film to produce film images. Now, the film is frequently replaced with an image intensifier and video camera to produce a video image. When the x-ray beam is projected on an image intensifier, rather than a flat sheet of film, there tends to be image distortion at the corners. More specifically, image intensifiers include a vacuum tube which has a spherical arc segment or dome on the receiving face. The dome moves further out of the traditional film plane and presents a more glancing angle to the x-rays with radial distance from the center of the dome. This produces "pin cushion" distortion in which the resultant image looks as if it were on a rubber sheet that was stretched outward at the corners.

The distorted image on the domed input face of the image intensifier is converted to a smaller higher intensity image which, of course, retains the pin cushion distortion. The distorted image is viewed by a video camera. A video signal from the video camera is conveyed to a video monitor on which the distorted picture is displayed.

Most commonly, video cameras include a magnetic sweep pattern control in order to maintain the accuracy of the high speed sweep pattern of a video tube. Although video cameras with electrostatic sweep controls are utilized for some applications, they have generally been considered undesirable for medical diagnostic imaging. First, controlling the ramp functions of the high voltages on the electrostatic plates required relatively slow, high voltage power transistors. The slow speed of the power transistors limits control of the video camera sweep pattern. Further, high capacitances involved in the sweep plates and the switching transistors limit the frequency response or switching times still further. Finally, the capacitance of the plates tends to be so large that the initial charging time at the beginning of each sweep produced a noticeable degradation of the sweep pattern.

In early image intensifiers, which were only about 15-20 cm across, this pin cushion distortion was not very pronounced. Although accurate measurements could not be scaled off the image, radiologists found it acceptable for diagnostic purposes. As technology has progressed, the size of image intensifiers has also increased such that today image intensifiers up to about 40 cm in diameter are available. The larger the diameter of the image intensifier, the larger the dome and the more pronounced the pin cushion distortion becomes around the edges of the picture.

Another drawback of the prior art image intensifiers is that the intensity of the distorted image decreases with radial distance from the center. Thus, edge portions of the image are not only distorted but also of lower intensity.

Another drawback of the prior art image intensifier and video camera systems is that a mechanical adjustment procedure is necessary in order to square the resultant image within the video monitor. That is, the orientation of the video monitor image is determined by the angular orientation of the video camera relative to the image intensifier. The video camera had to be physically moved relative to the image intensifier in order to eliminate an undesirable tilt or canting of the resultant video image relative to the video monitor.

The present invention provides a new and improved image intensifier system which substantially eliminates pin cushion distortion.

SUMMARY OF THE INVENTION

In accordance with the present invention, an image intensifier is connected with a video camera whose scanning or sweep pattern is controlled by a sweep control circuit. The image intensifier inherently produces an output image display with a known distortion. The video camera sweep circuit control alters the sweep pattern of the video camera to create a substantially equal and opposite distortion effect. In this manner, the image intensifier and video camera distortions cancel producing a substantially distortion-free resultant image representation.

In accordance with another aspect of the present invention, the video camera sweep control circuit includes an electronic image rotation means for electronically adjusting the video camera sweep pattern such that the resultant image is rotated, preferably to a preselected orientation.

In accordance with another aspect of the present invention, the video camera sweep control circuit controls the dwell time of the video camera sweep such that it reads edge portions of the distorted image for a longer duration than center portions. In this manner, the inherent intensity fall-off adjacent the edges of the distorted image intensifier image is corrected by the change in sweep pattern.

In accordance with another aspect of the present invention, the video camera sweep control circuit performs a third order correction.

In accordance with yet another aspect of the present invention, the video camera utilizes a three-way improved electrostatic sweep control, rather than the more common magnetic sweep control. First, the electrostatic sweep voltage is controlled by a high speed, relatively low voltage transistor. Zener diodes or the like are utilized to boost the controlled voltages which are applied to the electrostatic plates. Second, the controlled voltages to the sweep plates are controlled by transistors arranged in a common base configuration to reduce the capacitance, hence, increase the frequency response. Third, the controlled voltage switching circuitry of the sweep control circuit includes a constant current source to increase the speed with which the highly capacitive sweep deflection plates of the video camera can be brought to the controlled charge.

One advantage of the present invention is that it corrects for image intensifier distortion.

Another advantage of the present invention is that it accurately and precisely controls the sweep pattern of electrostatic video cameras.

Another advantage of the present invention is that the distortion corrected image can be rotated electronically without reintroducing distortion.

Yet another advantage of the present invention is that it corrects for intensity inconsistency in the output of image intensifiers.

Still further advantages of the present invention will become apparent to those of ordinary skill in the art upon reading and understanding the following detailed description.

BRIEF DESCRIPTION OF THE DRAWINGS

The invention may take form in various parts and arrangements of parts and in various steps and arrangements of steps. The drawings are only for purposes of illustrating the invention and are not to be construed as limiting it.

FIGS. 1A and 1B taken together are a diagrammatic illustration of an x-ray diagnostic system, image intensifier, electrostatic video camera, and sweep control circuit in accordance with the present invention;

DETAILED DESCRIPTION OF THE PREFERRED EMBODIMENT

Figure 2:
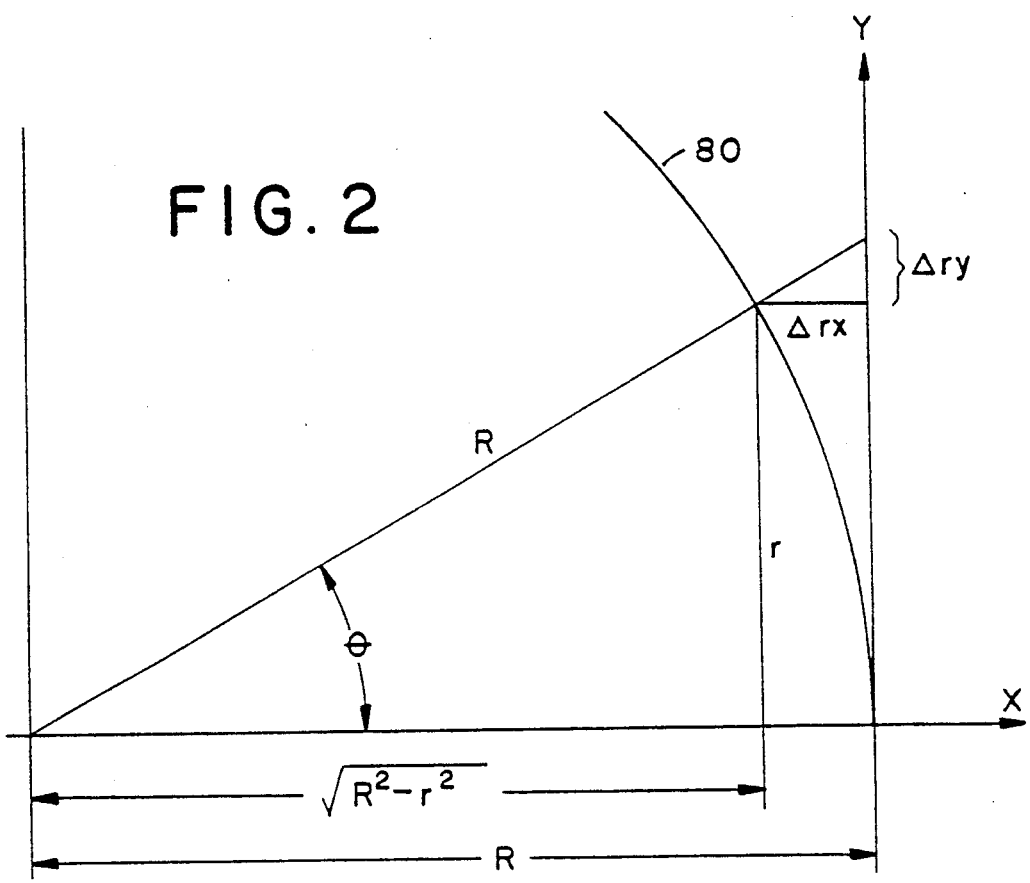
FIG. 2 is an illustration to assist in conceptualizing derivation of the distortion correction algorithm.

A source of penetrating radiation A, such as an x-ray tube directs a swatch of radiation 10 through a region of interest of a subject 12. The intensity of radiation that traverses the region of interest varies as a shadowgraphic projection of the x-ray absorptive properties of the materials in the region of interest. An image intensifier B converts this x-ray shadowgraph into a pin cushion distorted optical image. That is, x-rays impinge upon a phosphor screen 14 mounted to a dome shaped input face 16 of the image intensifier. The phosphor screen converts the x-rays into light of the visible spectrum that is projected onto a target 18 as an optically distorted image 20.

A video camera c converts the output optical image into a video signal or other electronic image representation. The electronic image representation can be stored on tape or disk, subject to various types of processing, displayed on a video monitor 22, or the like. The video camera includes a video pick-up tube 24 whose sweep pattern is controlled by electrostatic deflection plates 26a, 26b, 26c, 26d.

A sweep control circuit D modifies a conventional, linear beam sweep pattern to introduce a second distortion in the video camera image representation, which second distortion is equal and opposite to the image intensifier optical distortion. In particular, the modified sweep pattern generally follows the arcuate lines of a pin cushion distorted grid image 20 rather than conventional straight, parallel lines. Moreover, this arcuate sweep pattern becomes slower at points more radially outward from the center of the video pick-up tube. The lighter intensity peripheral portions of the intensifier image 20 become balanced with the intensity of central portions of the image in a resultant video image 28.

In the preferred embodiment, the sweep control circuit D adds a parabolic correction to the normal vertical and horizontal saw tooth sweep voltages. That is:

$$Vt = V + kV(V^2 + H^2) \tag{1a}$$

$$Ht = H + kH(V^2 + H^2) \tag{1b}$$

where V is the normal or uncorrected vertical sweep voltage and H is the normal or uncorrected horizontal sweep voltage, and k controls or determines the amount of correction. When k is equal to zero, conventional saw tooth vertical and horizontal sweep voltages are applied and an uncorrected image is produced. The value of k is increased, such as by adjusting a variable potentiometer or resistor until the resultant image 28 meets preselected criteria of accuracy and linearity. Of course, a third order parabolic correction of this form might also be provided in a magnetically controlled sweep tube type video camera or by shifting and averaging pixel values of a CCD type video camera.

In the preferred embodiment, the sweep control circuit D includes a vertical deflection ramp generator 30 and a horizontal deflection ramp generator 32. A mixed parabola generator includes circuit means 34 which calculates the sum of the squares of the vertical and horizontal ramp voltages. A multiplying or other magnitude adjusting means 36 multiplies the function by a selectable constant k. A first multiplying means 38 multiplies the vertical ramp voltage by the sum of the squares and a second multiplying means 40 multiplies the horizontal ramp by the sum of the squares function. A first adding means 42 adds the vertical voltage ramp to the parabolic product of multiplying means 38 and a second adding means 44 adds the horizontal ramp voltage to the parabolic product of multiplying means 40. In this manner, a vertical deflection voltage as described by Equation (a) and a horizontal deflection voltage as described by Equation (1b) are defined.

The parabolically adjusted sweep control signals are split and inverted by inverters 46 and 48. The inverted and uninverted parabolically adjusted sweep control signals are amplified by four substantially identical amplifiers 50a, 50b, 50c, 50d. The amplified inverted and uninverted vertical sweep signals are applied to the vertical sweep plates 26a, 26b and the amplified horizontal sweep signals are applied to the horizontal sweep plates 26a, 26b. Because all four amplifier circuits are substantially the same, only one is described herein in detail, which detailed explanation applies analogously to all four circuits.

The amplifiers increase the sweep voltages to provide a sweep voltage of ±200 volts on a 600 volt pedestal. A transistor 52, which can handle 400 volts, is interconnected with a pair of zener diodes 54, 56. These zener diodes each shift the voltage by 200 volts such that the transistor 52 only sees a 400 volt voltage swing, even although the plate voltages are swinging between 400 and 800 volts. The transistor 52 is connected with a common base configuration to eliminate a substantial portion of the capacitance. Because the frequency response of an amplifier is proportional to $\frac{1}{2}\pi RC$, minimizing the capacitance maximizes the frequency response of the amplifier.

In order to reduce the effects of the capacitance of the deflector plates, denoted electrically as $C_{26}$, an isolation transistor 58 disconnects the plate capacitance $c_{26}$ from the system capacitance $c_{sys}$. When transistor 52 is open, there is approximately 800 volts on the plates, hence on capacitor $C_{26}$. When the transistor 52 closes to ground, the voltage on $C_{26}$ drops to about 400 volts. When the transistor 52 closes, the current flows through transistor 52 and when it is open, the current charges capacitor $C_{sys}$. The output potential $E_{out}$ is related to a charging current $I_{in}$ flowing into $C_{sys}$. $I_{in}$ is established by the constant current source 60. Then $E_{out}$ may be expressed by the equation:

$$E_{out} = \frac{1}{c} \int I_{in}\, dt. \tag{2}$$

Some of this current also flows to the deflection plates or capacitor $C_{26}$. In order to bring the plates quickly to the applied potential, the isolation transistor 58 has a high current gain, e.g. 100:1, so that the output current is very high and capacitor $C_{26}$ charges quickly.

A diode 62 and resistor 64 hold the voltage on the base of a transistor 66 constant such that a constant, high current flows through resistor 68 and transistor 58.

Amplifier means 50b produces a complementary signal to that produced by 50a for application to the other vertical deflection plate. Analogously, amplifiers 50c and 50d produce complementary voltage signals for application to the horizontal deflection plates. An x,y interchanging means 70 interchanges the horizontal and vertical deflection signals and deflection plates 26a, 26b, 26c, and 26d to produce a 90° image rotation. A vernier rotation control 72a and 72b are provided for continuous rotation from 0 to ±45°. Alternately, the rotation control 72a and 72b may be interconnected with the image intensifier B or a support for the patient such that in diagnostic procedures in which the subject and image intensifier are moved relative to each other, the sweep pattern is not rotated but the image on the video monitor 22 remains constant.

Although a parabolic correction is utilized in the preferred embodiment, the exact shape of the correction is determined by the shape of the dome of the image intensifier. In the preferred embodiment, the dome is a spherical segment as illustrated by curve 80 of FIG. 2. The x and y distance from an arbitrary point on the curve to the point where a radial line through the curve point intersects the flat picture plan can be described by the coordinates $\Delta r_y, \Delta r_x$ where:

$$\Delta r_x = R - \sqrt{R^2 - r^2}. \tag{3}$$

Stated in terms of the tangent of the angle of the radius:

$$\tan\theta = \frac{r}{\sqrt{R^2 - r^2}} = \frac{\Delta r_y}{\Delta r_x}. \tag{4}$$

By similar triangles, $\Delta r_y$ can be stated as $$\Delta r_y = \Delta r_x \frac{r}{\sqrt{R^2 - r^2}}. \tag{5}$$

To simplify the mathematics, one can define the radius of the dome as unity:

$$\Delta r_y = \Delta r_x \frac{r}{\sqrt{1 - r^2}} \tag{6a}$$

$$\Delta r_x = 1 - \sqrt{1 - r^2} \tag{6b}$$

Substituting the value of $\Delta r_x$ in Equation (6b) into Equation (6a) expresses the value of $\Delta r_y$ in terms only or r.

$$\Delta r_y = \frac{(1 - \sqrt{1 - r^2})r}{\sqrt{1 - r^2}} \tag{7a}$$

$$\Delta r_y = \frac{r - r(1 - r^2)^{\frac{1}{2}}}{(1 - r^2)^{\frac{1}{2}}} \tag{7b}$$

$$\Delta r_y = r(1 - r^2)^{-\frac{1}{2}} - r. \tag{7c}$$

Using a Taylor series expansion of the form $(1 \pm x)^{\pm 1/n} = \mp nx + \ldots$, $\Delta r_y$ becomes:

$$\Delta r_y = r\left(1 + \frac{r^2}{2}\right) - r \tag{8a}$$

$$\Delta r_y = r + \frac{r^3}{2} - r \tag{8b}$$

$$\Delta r_y = \frac{r^3}{2} \tag{8c}$$

$$\Delta r_y = kr^3 \tag{8d}$$

Thus, the displacement $\Delta r_y$ along the flat picture plane is proportional by a constant k times the cube of r.

Figure 3:
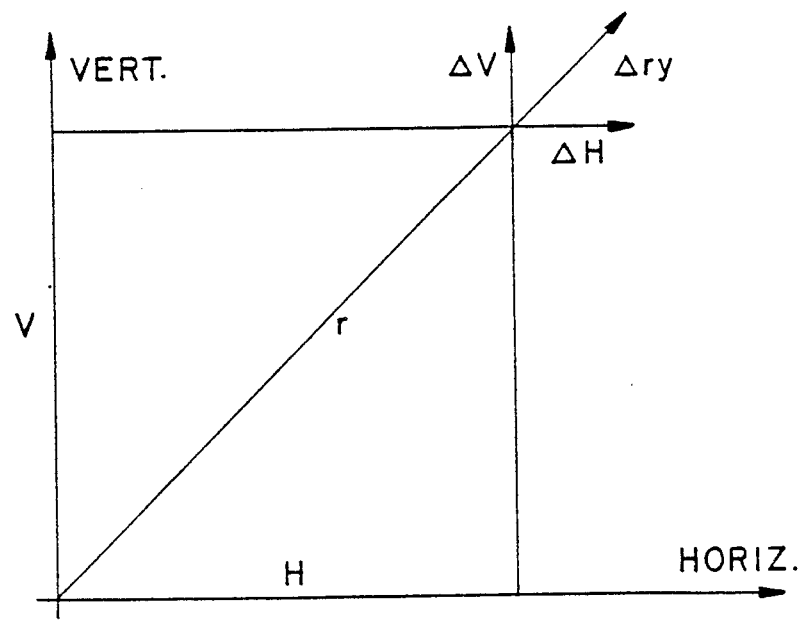
FIG. 3 is an illustration which assists in conceptualizing application of the distortion correction algorithm.

With reference to FIG. 3, a corresponding correction $\Delta V$ deflection voltage V and correction $\Delta H$ to the horizontal deflection voltage H can be readily determined by conventional trigonometry:

$$r^2 = V^2 + H^2 \tag{9}$$

$$r = \sqrt{V^2 + H^2} \tag{10}$$

$$\Delta V = \Delta r_y \frac{V}{r} \tag{11a}$$

$$\Delta H = \Delta r_y \frac{H}{r} \tag{11b}$$

Substituting Equation (8d) into Equations (11a) and (11b)

$$\Delta V = kr^3 \frac{V}{r} = kr^2 V \tag{12a}$$

$$\Delta H = kr^3 \frac{H}{r} = kr^2 H. \tag{12b}$$

Substituting Equation (10) into Equations (12a, 12b), the corrections $\Delta V$ and $\Delta H$ can be expressed solely in terms of V and H:

$$\Delta V = k(V^2 + H^2)V \tag{13a}$$

$$\Delta H = k(V^2 + H^2)H \tag{13b}$$

The corrected sweep values $V_T$, $H_T$ are the sum of the original sweep value and these corrections:

$$V_T = V + \Delta V \tag{14a}$$

$$H_T = H + \Delta H \tag{14b}$$

$$V_T = V + kV(V^2 + H^2) \tag{15a}$$

$$H_T = H + kH(V^2 + H^2) \tag{15b}$$

If an input lens or dome of a different contour is utilized, the appropriate corrections are calculated analogously.

It is to be further appreciated that additional refinement is obtainable through the use of the vernier rotational control 72a and 72b as shown in FIGURE Specifically through the use of the vernier rotation control Equations (15a) and (15b) are further refined to:

$$V_r = V + kV(V^2 + H^2) \pm KH \quad (16a)$$

$$H_T = H + kH(V_2 + H_2) \pm KV \quad (16b).$$

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having now described the preferred embodiment, the invention is now claimed to be:

1. A diagnostic imaging system comprising:
   an image intensifier which intensifies and optically distorts a received image such that an output intensified image has optical distortion;
   an electrostatic video camera for receiving the optically distorted output intensifier image, the electrostatic video camera including:
   an image pick up tube for converting the optically distorted image from the image intensifier into an electronic image representation.
   vertical and horizontal deflection plates,
   voltage ramp generating circuits for generating low ramp voltages,
   a correction circuit which generates a parabolic correction for altering the low ramp voltages from the ramp generating circuits to introduce a second distortion in the electronic image representation, which second distortion is substantially equal and opposite to the first distortion,
   an adding means for adding the parabolic correction to the low ramp voltages,
   a means for shifting the altered low ramp voltages to high ramp voltages for application to the deflection plates for controlling sweeping of a beam across the image pick up tube,
   a video monitor for converting the electronic image representation into a man-readable image, which man readable image is substantially distortion-free.

2. The system as set forth in claim 1 further including an electronic interchanging means for altering sweep signals of the sweep control means to rotate the resultant image.

3. A diagnostic imaging apparatus comprising:
   an image intensifier which intensifies and optically distorts a received image such that an output intensified image has optical distortion;
   a video camera in which a beam is swept repeatedly across an image pick up tube for converting a received image into an electronic image representation, the video camera receiving the optically distorted output intensified image;
   a sweep control circuit which alters sweeping of the video camera tube beam to introduce a second distortion in the electronic image representation, which second distortion is substantially equal and opposite to the first distortion, the sweep control circuit including an amplifying means for amplifying voltages applied to deflection plates adjacent the beam of the video tube for controlling sweep, the amplifying means including a low voltage switching transistor interconnected with at least one zener diode for shifting the switched voltages higher.

4. The apparatus as set forth in claim 3 wherein the transistor is connected with a common based configuration in order to reduce capacitance and increase amplifier frequency response.

5. The apparatus as set forth in claim 4 further including a second transistor for isolating the deflection plates from internal capacitance of the first transistor.

6. The apparatus as set forth in claim 5 further including a constant current source for providing a large recharging current for recharging the deflection plates.

7. The apparatus as set forth in claim 3 further including a constant current source for providing a large recharging current for rapidly recharging the deflection plates, which deflection plates have a relatively high capacitance.

8. The apparatus as set forth in claim 7 further including a second transistor for isolating the highly capacitive deflection plates from internal capacitance of the first transistor.

9. The apparatus as set forth in claim 3 wherein the sweep control circuit includes an inverting means for inverting a standard sweep signal, a first amplifier for amplifying and applying the sweep signal to a first deflection plate, a second amplifier for amplifying and applying the inverted sweep signal to second deflection plate opposite to the first deflection plate such that the first and second amplifiers operate in a push-pull relationship.

10. The apparatus as set forth in claim 9 wherein the sweep control means includes means for operating on a standard sweep control signal with a third order correction.

11. A sweep control circuit for an electrostatically controlled video camera, the sweep control circuit comprising:
    means for generating horizontal and vertical sweep control voltage ramps;
    a first inverting means for inverting the vertical control voltage ramp;
    a second inverting means for inverting the horizontal control voltage ramp;
    first, second, third, and fourth amplifier means for amplifying the vertical control voltage ramp, inverted vertical control voltage ramp, horizontal control voltage ramp, and inverted horizontal control voltage ramp respectively:
    the first and second amplifiers being operatively connected with a first pair of oppositely disposed deflection plates to provide voltage ramps thereacross in a push-pull relationship;
    the third and fourth amplifiers being connected with a second pair of oppositely disposed deflection plates for applying the voltage ramps thereacross in a push-pull relationship; each amplifier means including:
    low voltage, first transistor connected in a common based configuration for switching the control voltage ramp, a zener diode means for shifting the controlled voltage ramp to a higher voltage,
an isolation transistor for isolating capacitance of the first transistor from the deflection plate to which the amplified ramp voltage is applied,
a current source for providing a recharging current to the deflection plate.

12. The control circuit as set forth in claim 11 further including a means for operating on the horizontal and vertical control voltage ramps with a third order correction, before the voltage ramps are amplified by the first, second, third, and fourth amplifier means.

13. An x-ray diagnostic imaging system comprising:
an x-ray source mans for irradiating a region of interest with penetrating radiation;
a phosphor screen for converting penetrating radiation that has passed through the region of interest into an optical image;
an image intensifier having a domed input end operatively connected with the phosphor screen for intensifying the image to produce an intensified image, which intensified image is optically distorted by the image intensifier domed input end;
an electrostatically controlled video camera which has a pick up tube and electrostatic deflection plates that sweep an electron beam across a received image in accordance with voltages applied to the deflection plates, the video camera being connected with the image intensifier such that the pick up tube receives the distorted intensifier output image and converts it to an image representation;
means for generating low vertical and horizontal ramp voltages;
means for combining the generated vertical and horizontal sweep control ramp voltages with at least a third order corrections;
an amplifying means for amplifying the third order corrected low ramp voltages, the amplifier means including a low voltage transistor switching means interconnected with a means for shifting the switched third order corrected low ramp voltages to higher vertical and horizontal sweep control ramp voltages, the amplified third order corrected vertical and horizontal sweep control voltages being connected with the video camera deflection plates to control the electron beam sweep pattern;
a video monitor which converts the electronic image representation from the video camera into a man-readable image, the third order correction being selected relative to the image intensifier distortion such that the man-readable image is substantially free of optical distortion attributable to the image intensifier.

14. A method of diagnostic imaging, the method comprising:
projecting penetrating radiation through a region of interest;
converting the penetrating radiation that has passed through the region of interest into a first optical image, which first optical image is distorted with a first distortion;
converting the first optical image into an electronic image representation including applying ramped voltages to electrostatic deflection plates to sweep an electron beam of an electrostatically controlled video pick up tube across a face of the video tube that receives the first optical image;
modifying and amplifying the ramped voltages to change a sweep pattern of the electron beam and to create a second distortion in the electronic image representation, the second distortion being complementary to the first distortion such that the first and second distortions substantially cancel;
shifting the ramped voltages to higher voltages with a diode mans before application to the electrostatic deflection plates;
converting the electronic image representation into a man-readable image, which man-readable image is substantially distortion-free.

15. The method as set forth in claim 14 wherein the step of altering the electron beam sweep pattern includes:
generating a vertical control ramp function;
generating a horizontal control ramp function;
operating on the vertical and horizontal control ramp functions with a third order correction and using the third order corrected ramp functions to alter the sweep pattern.

16. The method as set forth in claim 15 wherein the step of operating on the vertical and horizontal control ramp functions includes adding a parabolic correction factor.

17. An x-ray diagnostic imaging system comprising:
an image intensifier having a domed input end operatively connected for intensifying a received image to produce an intensified image, which intensified image is optically distorted with a first distortion by the image intensifier domed input end;
a video camera which has a pick up tube and deflection plates that electrostatically control sweeping of an electron beam across a received image, the video camera being connected with the image intensifier such that the pick up tube receives the distorted intensifier output image and converts it to an image representation;
means for generating low voltage vertical and horizontal sweep control functions;
means for combining and modifying the vertical and horizontal sweep control functions to cause a second distortion in the image representation which second distortion substantially cancels the first distortion;
an amplifier means for converting the modified vertical and horizontal sweep control functions into high sweep control voltages and communicating the high sweep control voltages to the deflection plates of the video camera pick up tube to control the electron beam sweep pattern, the amplifier including:
a low voltage modified vertical and horizontal sweep control functions switching means, and
a means for shifting the switched low voltage vertical and horizontal sweep control functions to the high sweep control voltages;
a video monitor which converts the electronic image representation from the video camera into a man-readable image which the image intensifier distortion such that the man-readable is substantially free of optical distortion attributable to the image intensifier.

* * * * *